Feb. 7, 1956     C. D. MATTINGLY     2,733,889
VALVE AND FLUID CONTROL CONDUIT
Filed June 9, 1951
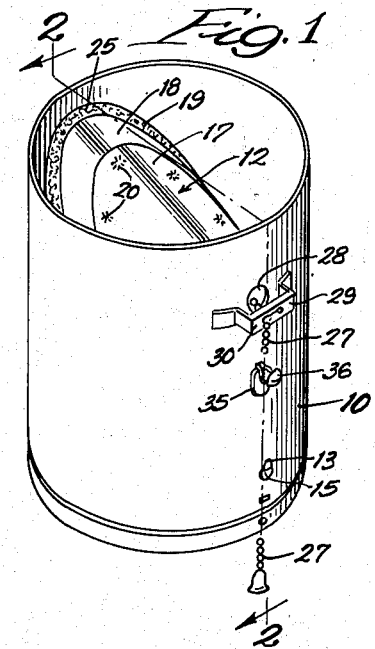
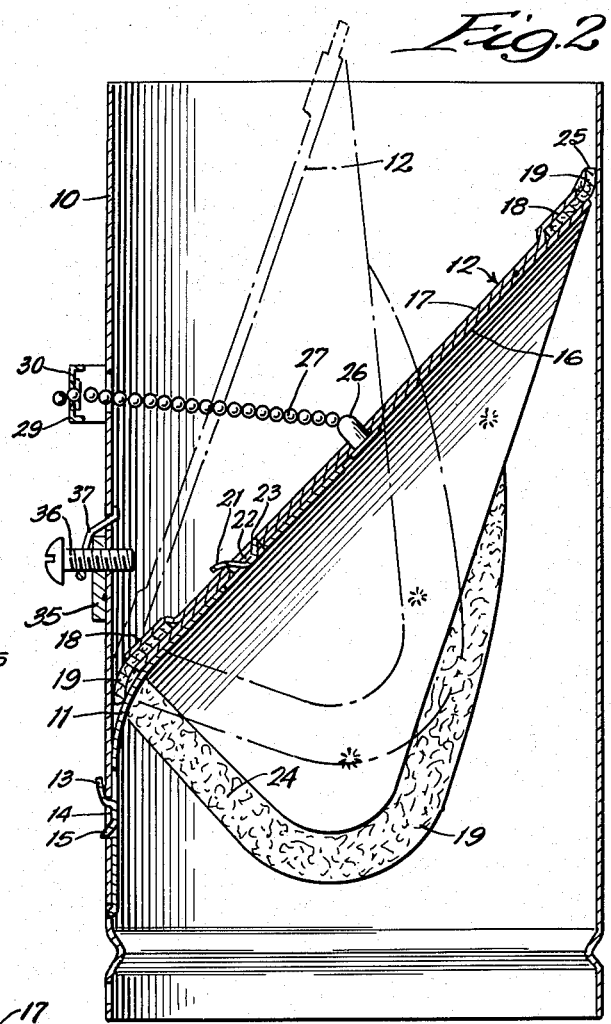
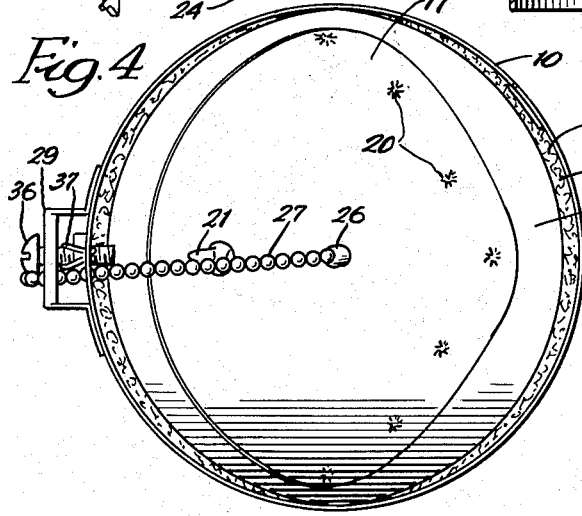
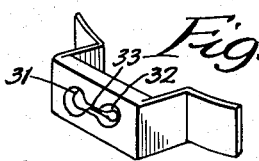
INVENTOR:
Charles D. Mattingly,
BY
Dawson & Ooms,
ATTORNEYS.

United States Patent Office 2,733,889
Patented Feb. 7, 1956

2,733,889

VALVE AND FLUID CONTROL CONDUIT

Charles D. Mattingly, Wichita, Kans., assignor to The Coleman Company, Inc., Wichita, Kans., a corporation of Kansas Application June 9, 1951, Serial No. 230,727

6 Claims. (Cl. 251—95)

This invention relates to a valve and fluid control conduit. The invention is particularly useful in connection with the flow of fluids such as air under relatively high pressure and velocities. The invention finds especially good application when employed immediately preceding the orifice or end of a pipe containing highly heated air which is discharged into a mixer for mixing room air with the highly heated air.

In the operation of a heating system in which highly heated air is conveyed through a relatively small conduit and discharged into an air mixer cabinet, air being drawn from a room for admixture with the highly heated air and then discharged through an outlet into the room, a difficult problem is presented in preventing turmoil in the air stream as it passes the valve. Further, the velocity of the current tends to produce noises such as whistling sounds when the valve is turned to different positions and it is important that such noises be eliminated. Similar problems arise with different types of conduits in which air is passed therethrough in substantially high velocity. The problem is further aggravated by the fact that the valve mechanism must be contained within the conduit and must present as little as possible obstruction to the air flow in any of the various positions to which the valve may be adjusted.

An object of the present invention is to provide a fluid control conduit and valve therefor which will materially reduce the turmoil ordinarily produced by valves in such conduits while also eliminating the noise encountered when ordinary valves are moved to various positions within the conduit. A still further object is to provide a unique form of valve which presents a minimum of resistance to the flow of air while accurately controlling the volume of air passing through the conduit and while eliminating whistling and other noises. A still further object is to provide a conduit with a valve structure in which the valve is secured in a unique manner within the conduit and urged toward sealing position while also providing means for maintaining the valve in any selected, partially open position. A still further object is to provide stop means which permit adjustment of the valve structure within the conduit to provide an air balance for the system while thereafter permitting the home owner to move the valve to fully opened or closed position within the seating and without changing the air balance of the system. A still further object is to provide an air flow control conduit with improved means of valve assembly and movement limit means therefor. Other specific objects and advantages will appear as the specification proceeds.

The invention is shown, in an illustrative embodiment, by the accompanying drawing, in which—

Fig. 1 is a perspective view of a valve and control conduit embodying my invention; Fig. 2, a sectional view, the section being taken as indicated at line 2—2 of Fig. 1; Fig. 3, a perspective view of the lower portion of the valve structure and supporting spring therefor, and illustrating the contours of fibrous sealing pad employed; Fig. 4, a top plan view; Fig. 5, a perspective view of the latch bracket; and Fig. 6, a perspective view of the tension spring clip employed for holding the adjusting screw in a set position.

In the illustration given, 10 designates a conduit which may be of any suitable type or construction. The pipe 10 may be employed in any portion of a forced air or hot air system, or in any high velocity fluid system. The invention is found to be particularly useful in connection with the hot air pipe entering an air mixer unit in which air is drawn from a room and after admixture with the hot air from the pipe, discharged back into the room through another opening. Such a system is shown in detail in the copending application of Jack W. Kice, Serial No. 760,572, filed July 12, 1947.

Secured to the pipe 10 on one side is a flat spring member 11 which serves as a hinge for securing the valve 12 within the conduit 10. I prefer to employ a metal spring of high resiliency which gives a quick action in restoring the valve to its initial position after the valve is released. The spring may be secured to a wall of the conduit 10 by any suitable means. In the illustration given, a tongue 13 struck from the spring strip 11 is inserted through an opening 14 of the conduit 10 and a rearwardly struck tongue 15 is extended through the opening and turned in the opposite direction against an outer wall of conduit 10. By this means, the spring 11 is held fixedly against the wall of the conduit.

The valve 12 may be of any suitable construction but is preferably of an elongated concave shape extending obliquely across the conduit 10, as illustrated in Fig. 2. In the specific illustration given, I provide an inner concave metal plate 16 and an upper or outer concave plate 17. The upper plate 17 is provided with an outwardly-stepped border portion 18. A felt or other fibrous sealing pad 19 is secured between the border portion 18 of plate 17 and the lower or inner plate 16. The two plates are then welded together at points 20 inwardly of the felt 19.

The valve 12 may be secured to the spring 11 in the same manner in which the spring is secured to the conduit 10. An integral tongue 21 is struck from the spring and extended through an opening 22 in plates 16 and 17, as shown more clearly in Fig. 2. A short tongue 23 is also struck from the spring 11 and extended through the opening 22 in a direction opposite to that in which tongue 21 extends.

The felt 19 has a portion 24 which lies normally on the inner side of the plate 16 and with its outer side bearing against the side wall of conduit 10. However, at the forward end, the felt reverses itself and the forward portion 25 of the felt has its inner side bearing against the conduit 10, as shown more clearly in Figs. 2 and 3.

Any suitable means for securing the valve 12 at a desired angular position within conduit 10 may be employed. I find that a ball chain is particularly useful in providing a ready regulating means for this purpose. In the illustration given, a bell-shaped connection 26 is secured within a central opening of the valve 12 and a connected ball chain 27 is extended through an opening 28 in the conduit 10. A bracket 29 is provided with flanges which are preferably spotwelded to the conduit 10 and provide a bridge 30 having an aperture 31 for receiving the ball chain 27. A lateral reduced opening 32 is connected to opening 31 by a narrow slot 33 so that the chain may be drawn laterally through neck or slot 33 and released for locking within recess 32. Since the recess 32 will not permit the balls of the chain to pass therethrough, the chain is thus held securely in position until again moved laterally into the clearance opening 31.

In order to enable the installer to adjust the apparatus to a proper air balance for the system, I provide the conduit 10 with a nut 35 which may be spotwelded to conduit 10 and which receives an adjustment screw 36. I prefer to employ a tension spring clip 37 which may be anchored through openings in the conduit 10, and which exert tension upon the screw 36 to hold it in any desired set position. With the construction shown, it will be noted that the spring tongue 37 serves as a bearing member for engagement with the stop screw 36 when the valve 12 is swung to closed position.

The valve or vane 12 is of a modified ellipsoid shape and is generally in the shape of a hollow tongue so that when the wide end of the vane is hinged as illustrated in Fig. 2, and the tapered portion of the vane moved to the oblique position shown, a fairly close fit between the vane and the conduit is achieved. When the felt or fibrous sealing strip 19 is added, an excellent seal between the vane and the conduit is obtained. This design of the vane allows the air to flow with a minimum of eddies and provides a small, adjustable ellipsoid opening having no protruding points or other structure which would cause a whistling noise when the air flows past the vane. Further, a passage equipped with the vane offers a minimum of resistance to the flow of air in a fully opened position. The structure shown also permits ready adjusting and balancing of the air in the air flow system.

While the modified ellipsoid vane is shown consisting of two pieces of formed metal spotwelded together and securing a felt gasket completely around the perimeter thereof, it will be understood that this result may be accomplished with other types of material such as, for example, a vane manufactured of soft felt material impregnated with plastic and molded into the shape illustrated. Other structures may be used to give the tolerance and resistance to the passage of air in closed position, as already described.

The flat spring structure permits fast assembly while hinging the vane firmly to the circular conduit and maintaining the vane in the desired aligned position while also providing the power for moving the vane back to closed position.

Operation

In the operation of the structure, the valve 12 may be drawn to the position indicated by dotted lines in Fig. 2 and similarly to any other desired position, and the valve may be secured in the illustrated position by drawing the ball chain 27 laterally into the locking opening 32. Air, in flowing through the conduit with the valve in open or partially opened position, flows entirely on one side of valve 12 and between the valve and the opposite side of conduit 10. There are thus no valve edges presented to the air stream which would cause a whistling sound or other sound, and the air flows with a minimum of resistance through the conduit. There is a marked decrease in the turmoil of the air passing the valve as compared with the turmoil experienced in passing standard damper or other valves, and as a result less energy is lost in the form of heat while better injection of the air stream for the mixer apparatus is obtained.

The installer adjusts the screw 36 to provide for a maximum opening for the desired air balance of the system, and the spring clip 37 maintains the screw in the set position. Thereafter, the home owner may operate the valve 12 within the limits provided by the stop screw 36 and the closed position shown in Fig. 2 without disturbing the air balance provided for by the installer.

The felt or fibrous sealing pad 19 is effective with the plate structure shown in providing a seal along the entire periphery of the valve 12. It will be noted that the portion 24 of the felt strip 19 extends inwardly from the valve structure 12 and has its outer surface bearing tightly against the conduit wall to form a seal. This position is reversed, however, as the felt strip moves toward the upper tapered portion of the valve so that the upper tapered portion 25 extends outwardly of valve 12 and has its inner side abutting the conduit 10. The reversal in the position of the felt structure is illustrated best in Figs. 2 and 3. At all points about the periphery of the valve structure 12, the felt strip 19 is in sealing engagement with the conduit 10 to form a closure for the conduit, when the valve is in the closed position shown. When the valve or vane is partially opened, the flexible border strip 19 assumes a relatively straight position offering a minimum of resistance to the air flow.

While in the foregoing specification, I have set forth a specific structure in considerable detail for the purpose of illustrating a single embodiment of the invention, it will be understood that such details of structure may be varied widely by those skilled in the art without departing from the spirit of my invention.

I claim:

1. In combination with an air conduit, an elongated tapered valve of arcuate cross-section, a spring member secured to the conduit wall and to said valve and urging the narrow end of said tapered valve into engagement with the opposite wall portion, and means for locking the valve against the force of said spring in partially opened positions.

2. In combination with an air conduit, an elongated concave tongue-like vane adapted to fit in an oblique position for sealing said conduit, fibrous sealing means extending about the periphery of said vane, a spring member secured to said conduit and to said vane and normally urging said vane toward closed position for sealing said conduit, and means for locking said vane in partially opened positions against the force of said spring.

3. In combination with an air conduit, an elongated concave tongue-like vane adapted to fit in an oblique position for sealing said conduit, fibrous sealing means extending about the periphery of said vane, a spring member secured to said conduit and to said vane and normally urging said vane toward closed position for sealing said conduit, means for locking said vane in partially opened positions against the force of said spring, said means comprising a chain secured to said vane and extending through an opening in said conduit, and a bracket equipped with a release opening and a connected latch opening for locking said chain.

4. In combination with an air conduit, an elongated, tapered concave valve adapted to extend obliquely across said conduit for sealing the same, fibrous sealing means comprising a strip of material extending about the periphery of said valve and being reversed upon itself adjacent the tapered end portion thereof, a spring member secured to said conduit and to said valve at the enlarged portion thereof and being operative to normally urge said valve toward closed position for sealing said conduit, and means for locking said valve in selected open positions against the force of said spring.

5. The structure of claim 4 in which an adjustment screw is provided, said screw being adjustably carried by said conduit and engageable with said valve for limiting the extent to which the valve can be opened.

6. The structure of claim 4 in which said spring member comprises a strip of spring metal arranged to bias said valve in normally closed position.

References Cited in the file of this patent

UNITED STATES PATENTS

| | | |
|---|---|---|
| 385,292 | Baltzley | June 26, 1888 |
| 580,574 | Fowler | Apr. 13, 1897 |
| 1,000,719 | Cram | Aug. 15, 1911 |
| 1,142,894 | Leighton | June 15, 1915 |
| 1,180,389 | Friend | Apr. 25, 1916 |
| 1,195,102 | Schmidt | Aug. 15, 1916 |
| 1,248,926 | Schantz | Dec. 4, 1917 |
| 1,308,492 | Hutchinson | July 1, 1919 |
| 1,578,872 | Walsh | Mar. 30, 1926 |
| 1,800,323 | Shadrick | Apr. 14, 1931 |
| 2,088,571 | Boller | Aug. 3, 1937 |
| 2,151,296 | Knoerzer | Mar. 21, 1939 |
| 2,370,584 | Schneider | Feb. 27, 1945 |